J. TORONY.
BIRD TRAP.
APPLICATION FILED APR. 21, 1915.
1,158,012.
Patented Oct. 26, 1915.
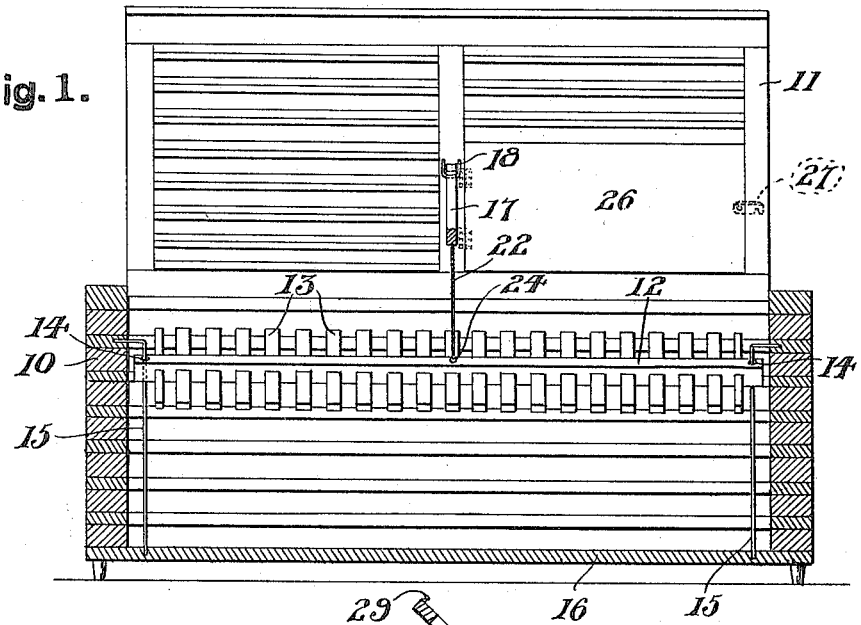
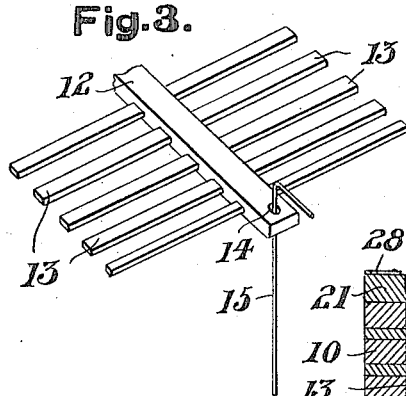
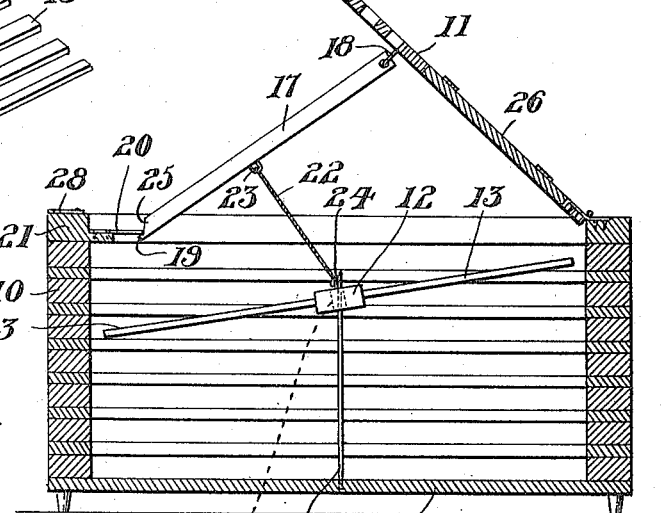
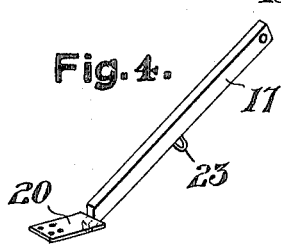
Inventor
J. Torony
By A. M. Wilson
Attorney

UNITED STATES PATENT OFFICE.

JOHAN TORONY, OF BORDERLAND, WEST VIRGINIA.

BIRD-TRAP.

1,158,012.  Specification of Letters Patent.  Patented Oct. 26, 1915.

Application filed April 21, 1915. Serial No. 22,870.

*To all whom it may concern:*

Be it known that I, JOHAN TORONY, subject of the King of Hungary, residing at Borderland, in the county of Mingo and State of West Virginia, have invented certain new and useful Improvements in Bird-Traps, of which the following is a specification.

This invention relates to certain new and useful improvements in bird traps.

The primary object of the invention is to provide a trap especially adapted for catching birds and giving the appearance of a closed cage when set and ready to be sprung by a bird alighting thereon.

A further object is to provide a trap having a shiftable platform mounted within and adjacent the top of the trap when the latter is in its set arrangement, a trip being designed to automatically release the platform under the weight of a bird and whereby the trap is closed for catching the bird.

A still further object of the device is to provide a bird trap having a cage with a hinged lid and a trip engaged floating platform attached to the lid whereby the raising of a bird upon the platform automatically trips the trap for closing the lid thereof and capturing the bird.

With these general objects in view and others that will appear as the nature of the invention is better understood, the same consists in the novel combination and arrangement of parts hereinafter more fully described, illustrated in the accompanying drawings, and pointed out in the appended claims.

In the drawings forming a part of this application and in which like-designating characters refer to corresponding parts throughout the several views, Figure 1 is a vertical longitudinal sectional view of the device in its open set position. Fig. 2 is a transverse vertical sectional view thereof. Fig. 3 is a perspective view of one end portion of the floating platform of the device, and Fig. 4 is a detail perspective view of the trip rod engaging with the trip plate, such elements being detached.

Referring more in detail to the drawings, the trap broadly consists of the crate-form of cage 10 adapted for receiving and holding the captured birds and provided with the hinged cover or lid 11. A floating platform is arranged vertically adjustable within the cage being of slightly less dimensions than the lid 11 and being formed of a central longitudinal rib 12 having spaced oppositely projecting bars 13 and constituting a grid formation.

The rib 12 is provided with a vertical opening 14 adjacent each of its opposite ends and through these openings the vertically arranged rods 15 are positioned. The rods 15 are secured between the bottom 16 and the adjacent ends of the cage and the floating platform is arranged vertically shiftable upon the said rods in the manner above described.

A trip rod 17 is swingingly mounted by means of a link 18 and the cage lid 11 and substantially central thereof and has its free end provided with a finger 19 adapted to engage beneath a trip plate 20 carried on the inner side of the front rail 21 of the cage and substantially central of the said rail. A cord 22 connects the trip rod as at 23 with the platform rib as at 24.

The complete operation of the device will be at once apparent from this detailed description thereof. By opening the cage lid 11 the trip rod 17 is readily positioned in engagement as a strut with the finger 19 beneath the trip plate 20 and with the oblique end 25 of the trip rod positioned against the inner edge of the plate whereby the same may be disengaged by any slight pressure or impulses that may be exerted upon the trip rod. Such positioning of the lid and trip rod necessarily elevates the floating platform by means of the connecting cord 22, the entire elements being positioned as shown in Figs. 1 and 2 when the trap is set for catching a bird. The appearance of the trip at this time is that of a substantially closed crate so that a bird will be free to perch upon the floating platform, whereupon the weight of the bird at once releases the trip rod 17 from the plate 20 thus allowing the lid 11 to drop of its own weight and inclosing the cage with the bird imprisoned therein. A hinged door 26 is provided in the lid 11 which has a securing latch 27, while a similar catch 28 is provided upon the cage rail 21 for engaging a pin 29 at the front edge of the lid for retaining the lid closed.

While the form of the invention herein shown and described is what is believed to be the preferred embodiment thereof, it is nevertheless to be understood that minor changes may be made without departing from the spirit and scope of the invention as claimed.

What I claim as new is:—

1. A cage comprising a crate member, a hinged closure lid at the top of said crate, a floating platform within said crate, guides for the platform, a trip rod hinged at one of the ends to the lower side of the said lid and engaging the crate member at the other end, and a connecting cord between the said rod and platform.

2. A bird trap comprising a crate, a hinged closure lid for the said crate, vertically arranged rods within said crate adjacent the opposite ends thereof, a floating platform provided with perforations at its opposite ends and threaded upon the said rods, a trip plate at the forward side of the crate, a trip rod hinged to the said lid and adapted for engagement with the said plate, and a supporting cord connecting between the said platform and trip rod, the said platform being in its elevated position, when the lid is in its open set position.

In testimony whereof I affix my signature.

JOHAN TORONY.

Copies of this patent may be obtained for five cents each, by addressing the "Commissioner of Patents, Washington, D. C."